Figure 5:
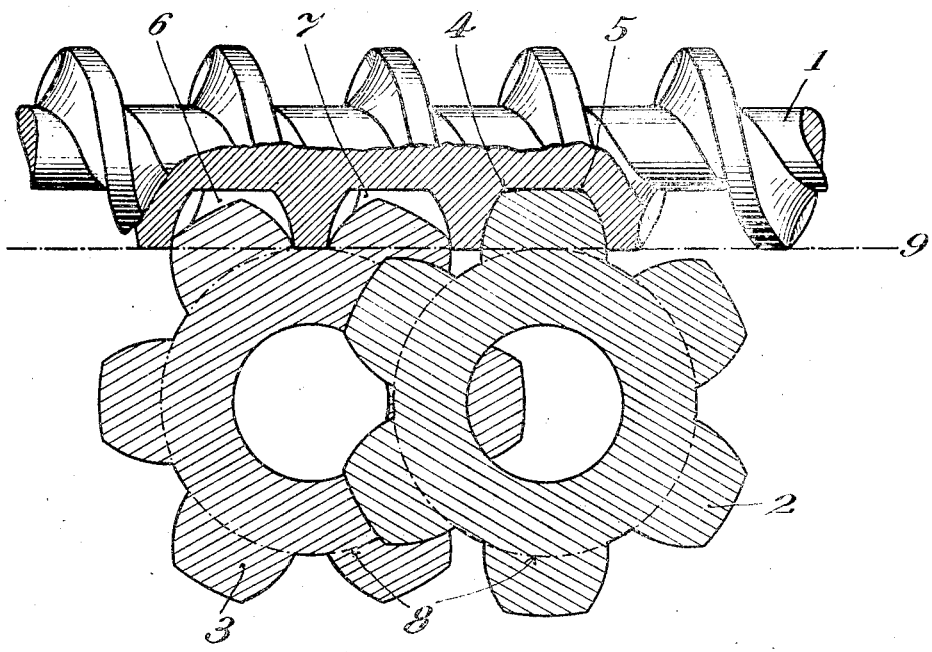

Aug. 6, 1929.  H. GÜTTINGER, JR  1,723,157
SCREW PUMP
Filed Dec. 22, 1926  2 Sheets-Sheet 1
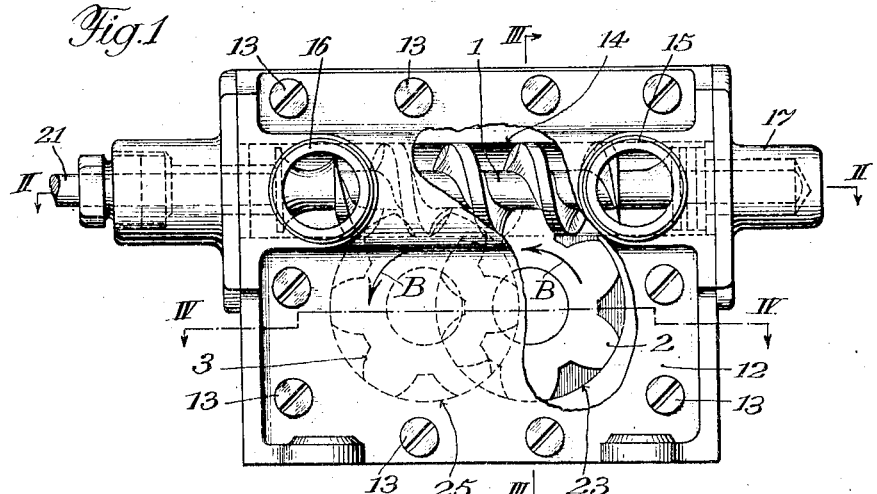
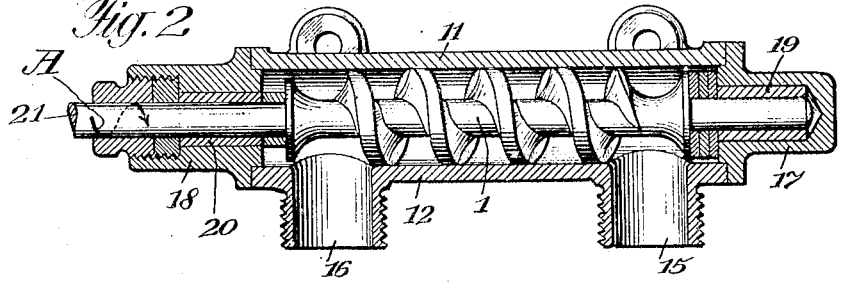
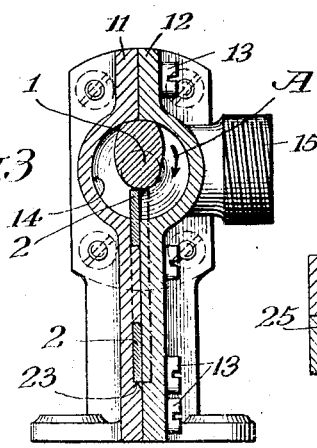
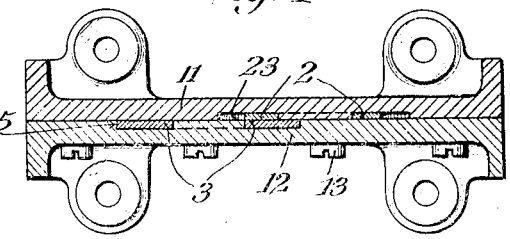
Inventor:
Heinrich Güttinger, Jr.
Atty.

Patented Aug. 6, 1929.

1,723,157

UNITED STATES PATENT OFFICE.

HEINRICH GÜTTINGER, JR., OF WETTINGEN, SWITZERLAND, ASSIGNOR, BY MESNE ASSIGNMENTS, TO MOTOR PUMPEN GESELLSCHAFT M. B. H., OF BERLIN, GERMANY, A COMPANY OF GERMANY.

SCREW PUMP.

Application filed December 22, 1926, Serial No. 156,459, and in Switzerland December 30, 1925.

The present invention refers to improvements in screw pumps of the type in which the obturation of the rotating screw which causes the flow of the fluid is obtained by means of at least one toothed disc the teeth of which engage between the screw threads.

According to the invention the flanks of the teeth of the toothed discs are shaped according to the laws governing the cycloidal or involute gear systems, the base circle also called the dedendum circle, of the teeth of the discs in this construction coincide with the pitch circle of these teeth and rolls on the outer cylinder enveloping the screw thread.

A constructional example of a pump according to the present invention is illustrated on the accompanying drawing, in which Fig. 1 is an elevation of the pump with parts broken away, Fig. 2 is a horizontal section along line II—II in Fig. 1, Fig. 3 is a vertical section along line III—III in Fig. 1, Fig. 4 is a horizontal section along line IV—IV in Fig. 1 and Fig. 5 shows the teeth of a disc cooperating with the screw.

Referring now to the drawings the casing of the pump consists of two halves 11 and 12 screwed together by screws 13. The two parts of the casing enclose a cylindrical bore 14, and the part 12 of the casing is provided with a suction branch 15 and a delivery branch 16 which communicate with the cylindrical bore 14. The two ends of the latter are closed by bearing caps 17 and 18 respectively fixed to the casing and lined with bushes 19 and 20 respectively in which the shaft 21 of a screw 1 is rotatably mounted. The screw 1 fits exactly into the cylindrical bore 14. The cap 17 is closed at its outer end and the cap 18 is provided with a stuffing box 22 for packing the shaft 21 which leads to a motor (not shown in the drawing) for driving the pump. It is assumed that the screw is driven in the clockwise direction when looking towards the left hand side in Fig. 2 as is indicated by the arrow A in Fig. 2.

The part 11 of the pump casing is provided with an annular recess 23 in which a toothed disc 2 is located and the part 12 is provided with an annular recess 25 into which the toothed disc 3 fits exactly. The two discs 2 and 3 bear on each other as is shown in Fig. 4 and the inner side of each disc is flush with the vertical longitudinal centre plane of the pump in which plane the casing is divided into halves. The teeth of each disc 2 or 3 project in between the screw threads of the screw 1 and the flanks of the teeth are shaped according to cycloids or involutes and fit exactly the flanks of the profile of the screw thread. The base circle 8 of the teeth of the discs coincides with the pitch circle of these teeth and rolls on the cylinder 9 enclosing the screw 1 (Fig. 5). The two discs 2 and 3 are displaced longitudinally of the screw by 1½ pitches of the latter.

When a tooth is in the position of its deepest engagement with the screw thread, as is illustrated in Fig. 5, the obturation is not quite complete as small gaps 4 and 5 are formed so that small losses in the pressure fluid occur, the gaps 4 and 5 are, however, infinitely small as compared with the spaces 6 and 7 of the disc 3; further the theoretically correct form of the teeth of the discs, which is responsible for these clearance spaces reduces considerably the wear of the toothed discs so that the losses due to the clearance are voluntarily taken into the bargain. The discs are preferably made of a material which is softer than the screw and does not wear out the latter at the high speeds at which such pumps run.

The operation of the above described screw pump is as follows:

When the screw 1 is driven to rotate in the direction indicated by the arrow A in Fig. 2 the two discs 2 and 3 are caused to rotate by their engagement with the screw thread in the direction indicated by the arrows B in Fig. 1. The fluid, liquid or a gas are sucked into the branch 15 as during the rotation of the screw the obturation performed by the toothed disc displaces itself from the right towards the left and the length of the working chamber formed by the space between adjacent windings of the screw threads and between the suction branch 15 and the obturating tooth of the first disc 2 increases, whereby a suction action is generated. On the side towards the discharge branch 16 the opposite is the case in as much as the length of the working chamber decreases and an increase in pressure results.

I claim:

1. In a screw pump, in combination, a casing, a screw rotatably mounted in said casing, at least one toothed disc rotatably mounted about an axis transverse to the axis of the screw, the teeth cooperating with the thread of the screw and being shaped in accordance with the laws governing the cycloidal gear system and the base circle of the teeth of the disc coinciding with the pitch circle of these teeth and rolling on the cylinder enveloping the screw.

2. In a screw pump, in combination, a casing having a cylindrical bore, a screw rotatably mounted in said casing and fitting into said bore, two toothed discs enclosed in said casing and rotatable about axes transverse to the axis of the screw, the axes of the discs being displaced in the direction of the axis of the screw and both discs bearing on each other, the teeth of the toothed discs cooperating with the thread of the screw and being shaped in accordance with the laws governing the cycloidal gear system and the base circle of the teeth of the disc coinciding with the pitch circle of these teeth and rolling on the cylinder enveloping the screw.

3. In a screw pump in combination, a casing, a screw rotatably mounted in the casing, at least one toothed disc mounted to rotate on an axis of the screw, the flanks of whose teeth as well as the flanks of the screw are shaped according to the laws governing the cycloidal gear system for intermeshing with one another, and the base circle of said teeth rolling on the cylinder bounding the screw thread.

In testimony whereof, I have signed my name to this specification.

HEINRICH GÜTTINGER, Jr.